(12) United States Patent
Bowling

(10) Patent No.: US 7,382,290 B2
(45) Date of Patent: Jun. 3, 2008

(54) MAPPING PROGRAM INCLUDING A MAP, PROCESS AND SYSTEM FOR PRECISELY REPRESENTING OR DETERMINING A LOCATION ON THE MAP AND AN ELECTRONIC DEVICE AND A STORAGE MEDIUM THEREFOR

(76) Inventor: Shannon Bowling, 1321 W. 27th St., Norfolk, VA (US) 23608

( * ) Notice: Subject to any disclaimer, the term of this patent is extended or adjusted under 35 U.S.C. 154(b) by 328 days.

(21) Appl. No.: 11/348,000

(22) Filed: Feb. 6, 2006

(65) Prior Publication Data

US 2006/0177105 A1    Aug. 10, 2006

Related U.S. Application Data

(60) Provisional application No. 60/650,275, filed on Feb. 4, 2005.

(51) Int. Cl.
*G08G 1/123* (2006.01)
(52) U.S. Cl. .............. 340/995.14; 340/995.1; 345/629; 701/209; 701/210
(58) Field of Classification Search ........... 340/995.14, 340/995.1, 995.15, 995.17, 995.26, 995.27; 345/629, 619, 632; 348/135, 147; 701/200, 701/209, 210, 212; 382/113
See application file for complete search history.

(56) References Cited

U.S. PATENT DOCUMENTS

| | | | | |
|---|---|---|---|---|
| 5,414,462 A | * | 5/1995 | Veatch | 348/135 |
| 5,549,332 A | * | 8/1996 | Judson | 283/34 |
| 6,577,714 B1 | * | 6/2003 | Darcie et al. | 379/93.17 |
| 6,678,615 B2 | * | 1/2004 | Howard et al. | 702/5 |
| 2006/0177105 A1 | * | 8/2006 | Bowling | 382/113 |

* cited by examiner

*Primary Examiner*—Toan N. Pham
(74) *Attorney, Agent, or Firm*—Goldizen & Assoc.; Bradley D. Goldizen

(57) ABSTRACT

A mapping program includes an overlay grid of intersecting lines represented by two series of numbers. An origin is defined and an area of interest is defined. The origin corresponds to a location on a map. One series of numbers relates to longitude; while the other series of numbers relates to latitude. Each series of numbers are represented by two or more digits. Each digit represents up to 35 different numerals or letters. When two digits are used to represent a location, the combined number of lines for each series of number may comprise up to 1225 lines. Thus, the total number of lines represented by each series of number corresponds to a power of the base number of possibilities up to 35; the power being represented by the number of digits used in each series of numbers. These numbers are overlaid onto a map having points corresponding to actual longitudinal and latitudinal locations. A device for converting between the latitude and longitude is provided. A storage medium is also provided for storing a series of steps to perform the operations.

20 Claims, 13 Drawing Sheets

Calculates first part (latitude) part of the location code (LAT1-LON1)

'Checks to ensure that current latitude is within reference points. Basically checks to see if point of interest is with Continental United States for South Reference of 24, and North Reference of 50. If point of interest is between reference points, the location code is calculated, if not error message is returned.
If Val(Lat) > N Or Val(Lat) < S Then
   L1 = "Err"
   GoTo 10
End If 'Convert current latitude in percentage between lower and upper reference points
'Lat = latitude of interest, S = south reference point (24), N = North reference point(50)
'Temp is variable that represents percentage between lower and upper reference points (between zero and one).
Temp1 = (Lat - S) / (N - S)

'Convert percentage into absolute number between zero and 35^4-1 (number of possible combinations with 35 characters 1-9,A-Z). Divides map into 1,500,624 increments.
Temp2 = (35 ^ 4-1) * Temp1

'Find first digit in location code
l11 = Int(Temp2 / 35 ^ 3)
'Find second digit in location code
Temp2 = Temp2 - (l11 * 35 ^ 3)
l12 = Int(Temp2 / 35 ^ 2)
'Find third digit in location code
Temp2 = Temp2 - (l12 * 35 ^ 2)
l13 = Int(Temp2 / 35)
'Find fourth digit in location code, because this is the last digit, the digit must be rounded up or down.
Temp2 = Temp2 - (l13 * 35)
l14 = Round(Temp2,0)

FIGURE 8

'Subroutine to round location code. If digit rounds up to 35, the digit must be changed to zero and the next digit must be incremented by one. This is checked for each digit in the code.
If l14 = 35 Then
    l14 = 0
    l13 = l13 + 1
End If If l13 = 35 Then
    l13 = 0
    l12 = l12 + 1
End If If l12 = 35 Then
    l12 = 0
    l11 = l11 + 1
End If If l11 = 35 Then
    l11 = 0
End If 'Add one to each digit to change initial reference from 0000 to 1111
l11 = l11 + 1
l12 = l12 + 1
l13 = l13 + 1
l14 = l14 + 1

'Check to see if digits are greater than 9, if so convert these values to letters, 10-A, 11-B, 12-C, ... 34-Y, 35-Z etc. Uses Chr() function, Chr(65) = A, Chr(66) = B, etc.

If l11 > 9 Then
        l11 = Chr(l11 + 55)
    End If

If l12 > 9 Then
        l12 = Chr(l12 + 55)
    End If

FIGURE 9

```
If l13 > 9 Then
    l13 = Chr(l13 + 55)
End If

If l14 > 9 Then
    l14 = Chr(l14 + 55)
End If

'Display first part (latitude) of location code
L1 = l11 & l12 & l13 & l14

'Index mark to jump to if point of interest is not with reference points. Basically skips program
and displays error message for latitude part of location code.
Error = ERR-XXXX
10
```

FIGURE 10

Calculates second part (longitude) part of the location code (LAT1-LON1)

'Checks to ensure that current longitude is within reference points. Basically checks to see if point of interest is with Continental United States for West Reference of 125, and East Reference of 65. If point of interest is between reference points, the location code is calculated, if not error message is returned.
If Val(Lon) < E Or Val(Lon) > W Then
   L2 = "Err"
   GoTo 20
End If 'Convert current longitude in percentage between lower and upper reference points
'Lon = longitude of interest, E = east reference point (65), W = west reference point(125)
'Temp is variable that represents percentage between lower and upper reference points (between zero and one).
Temp1 = (Lon - E) / (W - E)

'Convert percentage into absolute number between zero and 35^4-1 (number of possible combinations with 35 characters 1-9,A-Z). Divides map into 1,500,624 increments.
Temp2 = (35 ^ 4 -1) * Temp1

'Find first digit in location code
l21 = Int(Temp2 / 35 ^ 3)
'Find second digit in location code
Temp2 = Temp2 - (l21 * 35 ^ 3)
l22 = Int(Temp2 / 35 ^ 2)
'Find third digit in location code
Temp2 = Temp2 - (l22 * 35 ^ 2)
l23 = Int(Temp2 / 35)
'Find fourth digit in location code, because this is the last digit, the digit must be rounded up or down.

Temp2 = Temp2 - (l23 * 35)
l24 = Round(Temp2,0)

FIGURE 11

'Subroutine to round location code. If digit rounds up to 35, the digit must be changed to zero and the next digit must be incremented by one. This is checked for each digit in the code.
If l24 = 35 Then
   l24 = 0
   l23 = l23 + 1
End If If l23 = 35 Then
   l23 = 0
   l22 = l22 + 1
End If If l22 = 35 Then
   l22 = 0
   l21 = l21 + 1
End If If l21 = 35 Then
   l21 = 0
End If 'Add one to each digit to change initial reference from 0000 to 1111
l21 = l21 + 1
l22 = l22 + 1
l23 = l23 + 1
l24 = l24 + 1
'Check to see if digits are greater than 9, if so convert these values to letters, 10-A, 11-B, 12-C, ... 34-Y, 35-Z etc. Uses Chr() function, Chr(65) = A, Chr(66) = B, etc.
12-C, etc.
If l21 > 9 Then
   l21 = Chr(l21 + 55)
End If
If l22 > 9 Then
   l22 = Chr(l22 + 55)
End If
If l23 > 9 Then
l23 = Chr(l23 + 55)
End If
If l24 > 9 Then
   l24 = Chr(l24 + 55)
End If 'Display second part (longitude) of location code
L2 = l21 & l22 & l23 & l24

FIGURE 12

'Index mark to jump to if point of interest is not with reference points. Basically skips program and displays error message.
20

'If either to latitude or longitude point of interest is outside of reference an error message is displayed as:
Latitude error = ERR-XXXX
Longitude error = XXXX-ERR
Both latitude and longitude error = ERR-ERR
Neither error = XXXX-XXXX 'Display Code as XXXX-XXXX
LocationCode = L1 & "-" & L2

FIGURE 13

MAPPING PROGRAM INCLUDING A MAP, PROCESS AND SYSTEM FOR PRECISELY REPRESENTING OR DETERMINING A LOCATION ON THE MAP AND AN ELECTRONIC DEVICE AND A STORAGE MEDIUM THEREFOR

The present application claims priority from U.S. Provisional Patent Application Ser. No. 60/650,275 filed on Feb. 4, 2005 and claims priority therefrom.

This application did not receive federal research and development funding.

BACKGROUND OF THE INVENTION

The present invention relates to systems, devices and methods for precisely determining a position on a map. More specifically, the present invention relates to a novel method and apparatus for determining a position with a new coordinate system. Characters represented by letters and numbers are used to reduce the quantity of numbers ordinarily necessary for representing a position on a map.

Any location on earth may be described by two sets of characters that represent coordinates on a map. Latitude and longitude are currently used for representing positions on a map. Both latitude and longitude are angles measured in degrees, minutes of arc and seconds of arc. To specify the latitude of a point on the surface of the earth, a line is drawn from the origin or center of the earth to the point. The equator has latitude of zero, while the North and South Poles have latitudes of ninety degrees. An elevation angle between the equator and the point is calculated. This elevation angle is expressed as mentioned above. Latitude corresponds to a North and South movement of a person or object across a surface area of the Earth.

Longitude "meridians" extend from the North Pole to the South Pole. Every meridian crosses the equator which is divided into 360 degrees. The longitude angle of a point is defined by the value where a meridian crosses the point and the equator. Longitude corresponds to an East and West movement of a person or object across the surface area of the Earth.

One problem associated with using latitude and longitude coordinates to represent a location is the difficult nature of easily remembering a particular location when it does not correspond to an absolute elevation angle and particular meridian. To specify a particular point of interest, as many as 18 digits may be required, an example might be W 137.23145, N 120.12359. Often, users will give directions to a particular point by providing an address or coordinates. Directions may be provided that include landmarks an approximate distances.

Others have tackled the problem of providing directions to a particular point by assigning addresses to the point. This requires the use of massive databases that contain all of the address information. Until now, there were no ways in which individuals or business could easily specify the location of their residences without the use of a cumbersome coordinate code or address.

The present invention overcomes this problem by providing a system and apparatus that easily converts a location from a standard latitude and longitude format into an easily recognizable format. Thus, a user may easily represent his residence, place of business or point of interest in an easy format that may be represented by a string of characters, for example, 1RZ2A44B. This string of characters, when recognized in the format of the present invention, intuitively allows a user to proceed in a general direction towards a point of interest. Moreover, if a character sequence representative as a starting point is known, the user easily recognizes a direction to proceed.

Through, use of the present system, any location in the continental United States may be represented by eight digits or characters to within ten feet. By adding an additional character or two, the elevation from sea level of a particular point of interest may also be represented. The instant invention allows users to input a "location code" in a handheld device such as a global position system "GPS" unit, mobile telephone system or other such device having a microprocessor and including a software storage medium having a software program stored therein that converts any location on a map into a series of characters that may be easily recognized and intuitively used. These devices may include a microprocessor equipped with an algorithm that converts the location code into coordinates to provide a user with directions and distances to a point, estimated time of arrival, bearing and the like. A storage medium is also provided that includes the process for realizing the invention. The invention may also be useful in military application for easily specifying target locations for guided weapons systems.

BRIEF SUMMARY OF THE INVENTION

The invention is a new coordinate system for a map that allows any location in the world to be represented by two sets of characters that comprise numerals or letters, where the numerals are preferably between 1-9 and the letters are from A-Z. A third set of characters may be utilized for realizing an elevation of that point. Each set of characters may comprise from one to four characters to represent a point of interest on a map having an overlay that covers an area equivalent to the continental United States. If a set of characters include a fifth character (50A, 50B of FIG. 5F), a location on the entire planet of Earth may be represented to within 2.5 feet by 2.5 feet. The first character is representative of a numeral or a letter that represents a location of a point of interest on a map having an overlay that comprises a several pluralities of grids. The first character corresponds to a location of the point of interest within a first plurality of grids. The second character represents the location of the point of interest within the second plurality of grids, where the second plurality of grids is created by breaking down the first plurality of grids. The third character corresponds to the location of the point of interest within a third plurality of grids, where the third plurality of grids is created by breaking down the second plurality of grids. The fourth character corresponds to the location of the point of interest within a fourth plurality of grids, where the fourth plurality of grids is created by breaking down the third plurality of grids. In essence, each further character raises the previous character to a power within a range of from 1 to 35. Any letter may be represented in the characters. However, the number zero is preferably not represented to avoid confusion between it and the letter "o". Though it should be realized that the number zero may be used and the letter "o" may be omitted in the characters. Likewise, other characters and numbers may be omitted for using the invention in smaller geographic regions or added for larger regions. Thus, each character may preferably represent at least up to 35 different values.

In the present invention, an origin of a map overlay is created such that the origin lies at least on a map boundary representing a landmass such as an island or a continent, a country, a state, a territory, county, municipal or the like.

This overlay is then positioned atop a map. The overlay includes a first plurality of grids that are defined by a first character in each of two sets of characters. These grids are broken down into a second plurality of smaller grids which are represented by a second character in each set of characters. The second plurality of grids is further broken down by a third plurality of grids that are smaller and represented by a third character in each set of characters. The third plurality of grids is broken down by a fourth plurality of grids, represented by a fourth character in each set of characters. If necessary, a fifth plurality of grids may break down the fourth plurality of grids into still smaller grids. An additional set of characters may be provided for representing an elevation of a point of interest.

It is an object of the invention to provide an alternative system for replacing or enhancing the current method of specifying locations in the world that overcomes problems associated with the current method for representing a location. The present system may also be used in tracking extraterrestrial objects.

It is another object of the invention is to provide a method that offers intuitive information about a location. This method may provide points of interest with a set of characters to easily represent location that have no addresses.

It is still another object of the invention to provide a more practical method and system for representing a location in a more usable format that the current coordinate system. A character code may be entered into a handheld device with relative ease requiring only eight digits to represent any location in the continental United States. This overcomes the present dilemma of requiring as many as twenty to forty digits to define a particular address.

It is a further object of the invention to provide a handheld device that includes a microprocessor containing a set of instructions for converting a particular location from a coordinate system to a location represented by a set of characters of the instant invention. The handheld device may also convert a set of characters into coordinates.

It is another object of the invention to provide a database comprised of various locations that are referenced by a set of characters that are smaller than numerical values that represent a particular point of the present coordinate system.

Further objects, features and advantages of the invention will become apparent from a consideration of the following description and the included claims when taken in connection with the previous discussion and the accompanying drawings.

BRIEF DESCRIPTION OF THE DRAWINGS

FIGS. 8 through 13 are source code showing a software process for creating a map overlay and navigation process to practice the present invention.

DETAILED DESCRIPTION OF THE INVENTION

Figure 1:
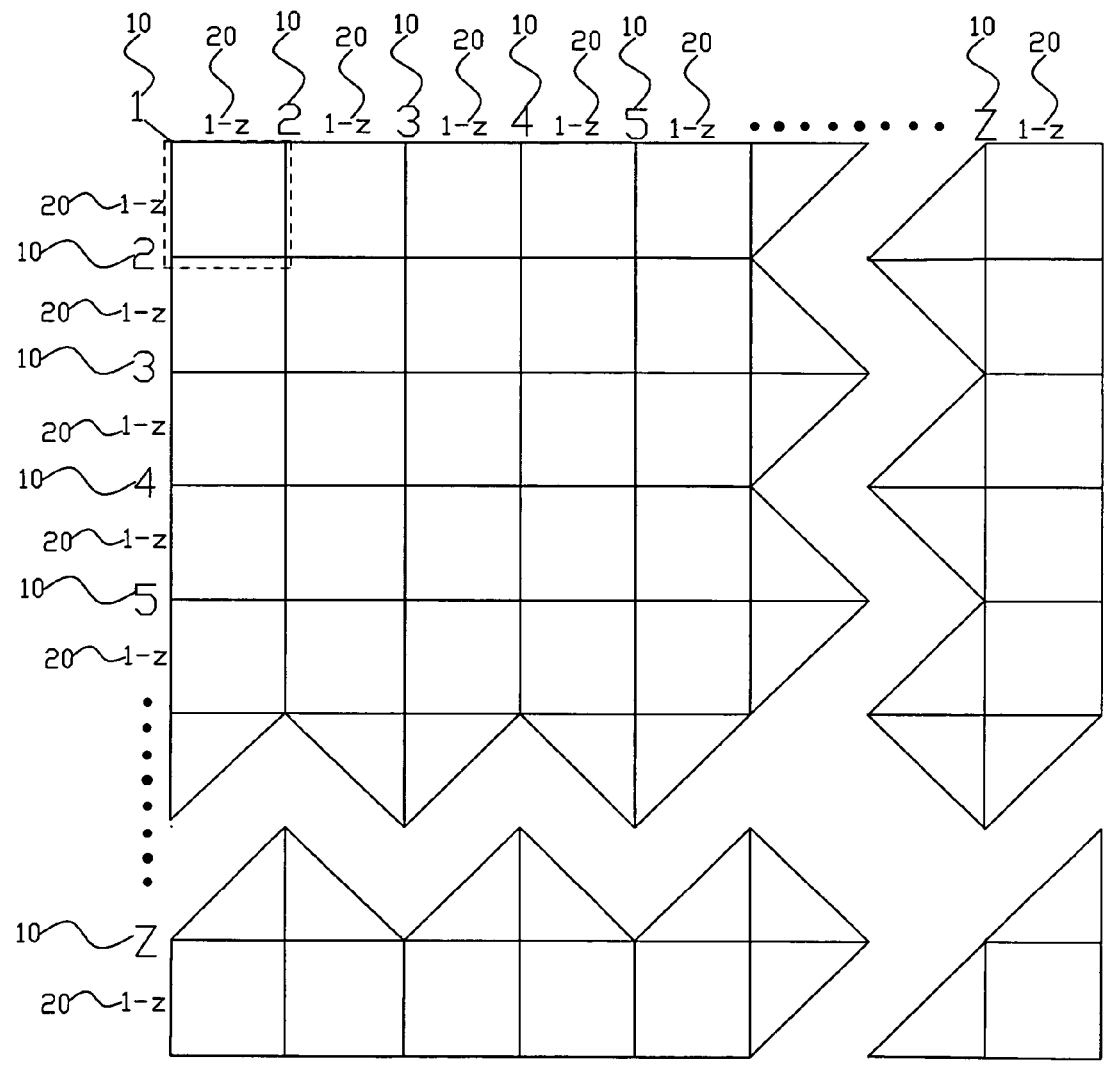
FIG. 1 is a view representing an overlay grid system comprising two sets of two characters that define a particular point on a map.
Figure 2:
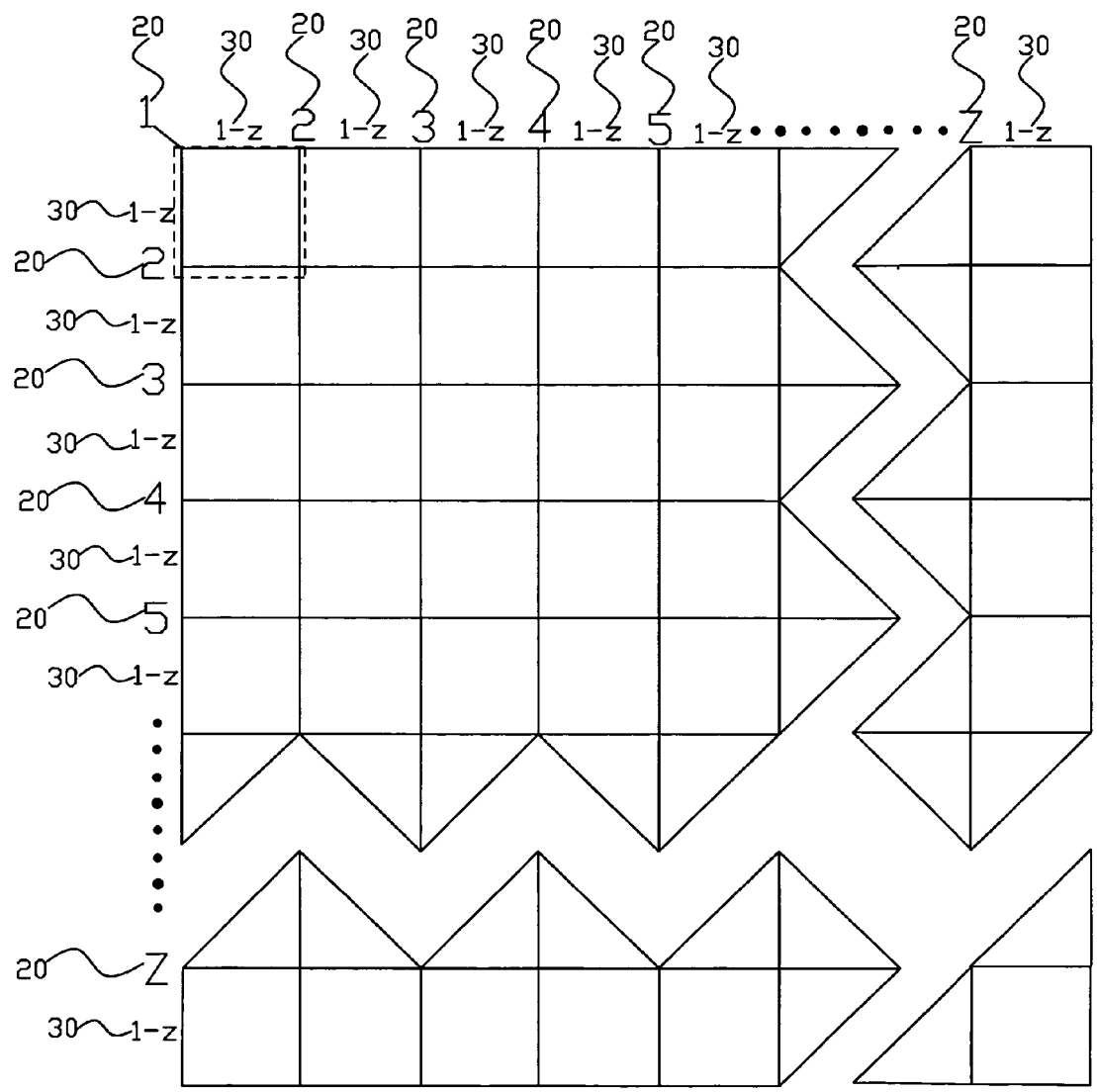
FIG. 2 is a view representing a grid system comprising two sets of three characters that define a particular point. This view relates to the view defined by the dashed lines shown in FIG. 1.
Figure 3:
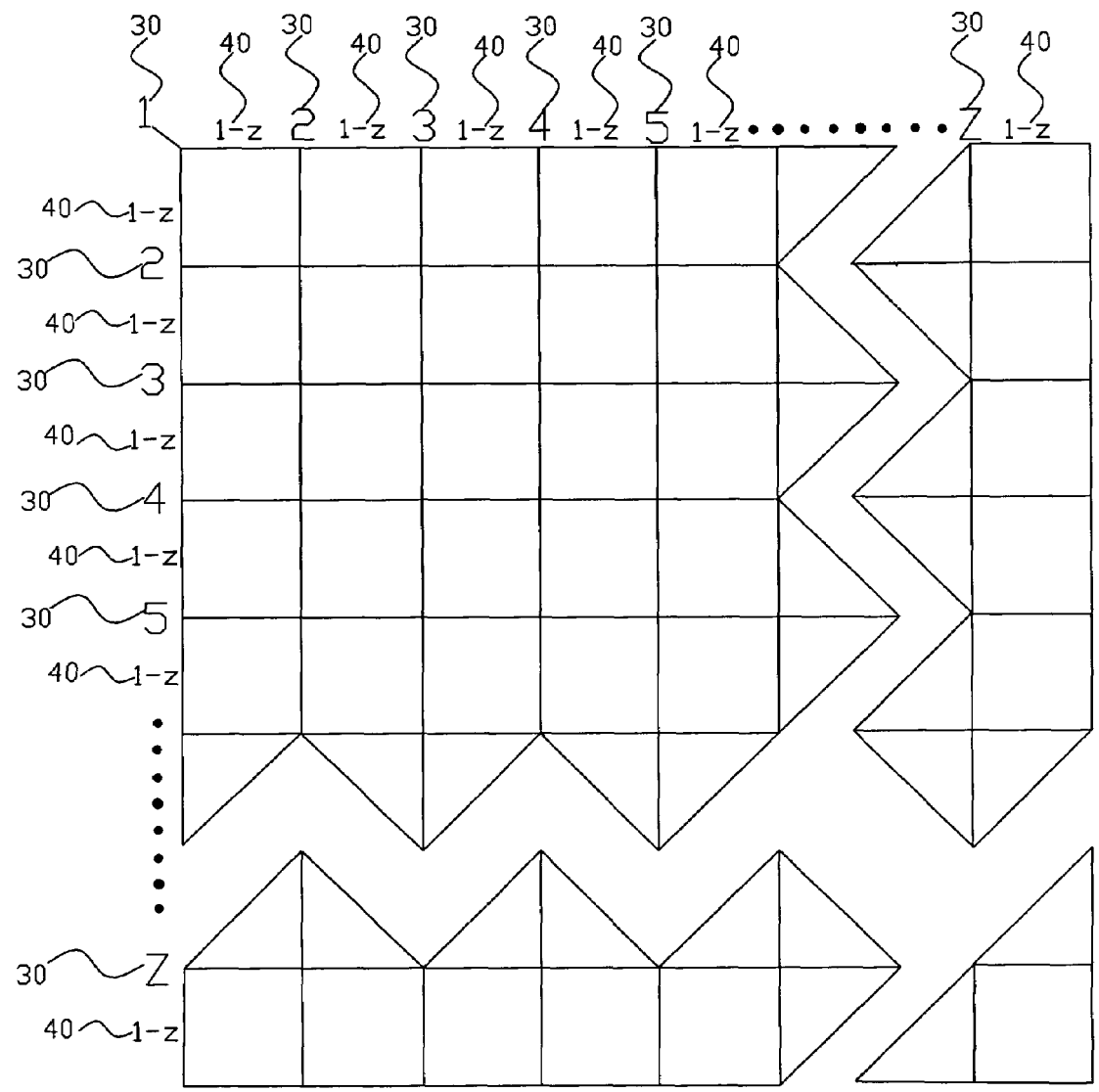
FIG. 3 is a view representing a grid system comprising two sets of four characters that define a particular point. This view relates to the view defined by the dashed lines shown in FIG. 2.

FIGS. 1 through 3 depict grids for overlaying a map to define a point. The present invention includes a base number of 35. This is created by using the numbers 1-9 and the letters A-Z. Thus, 1-Z corresponds to 35 individual characters. A 35×35 line grid may be constructed in this manner. Each individual grid defined by two horizontal and two vertical lines may be further broken down by adding a second set of characters relating to 1-Z. This process can be continued until an infinite number of smaller grids are created. Thus, the base number of 35 is raised to an exponential value each time another set of characters are added.

In FIG. 1, characters 10A and 10B relate to a first number of each set of characters defining a point. Characters 20A and 20B, as shown in FIG. 1, relate to the second number in each set of characters. When written in the following coordinates format {XX; XX}, as shown in FIG. 5B, the first set of characters relate to latitude and the second set of characters relate to longitude or visa versa. In FIG. 1 each character 10 represents a coordinate that is further broken down by characters 20. Thus, for each character 10, there exists an additional 35 lines represented by characters 20. A point defined by {1,1;1,1} would be found within the grid defined by the broken line. In fact, a 35×35 array is defined within this grid by characters 20. Thus, any point referenced by {1,1-Z;1,1-Z} is found within this grid.

Figure 5A:
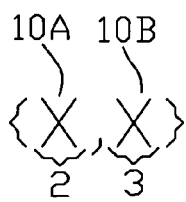
FIG. 5A represents a set of location codes that create a map overlay having 34 separate grids.
Figure 5B:
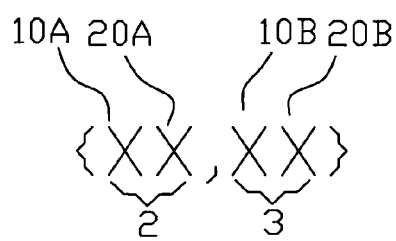
FIG. 5B represents a set of location codes that are used in a map overlay wherein the first set of 34 grids are each broken down into a second set of 34 grids.
Figure 5C:
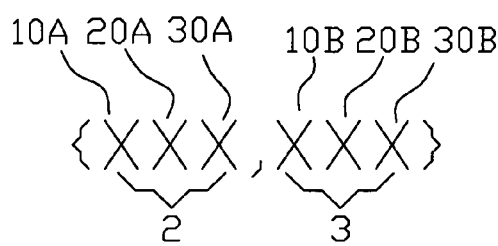
FIG. 5C represents a set of location codes wherein the second set of 34 grids are each broken down in a third set of 34 grids.

FIG. 2 relates to a point defined by two sets of three characters {1,1,1;1,1,1}, as shown in the format shown in FIG. 5C, and corresponds to the area defined by broken lines in FIG. 1. As can be understood the number of lines provided for creating the grid work is $35_3$. Thus there is created a 42,875×42,875 array of lines.

Figure 5D:
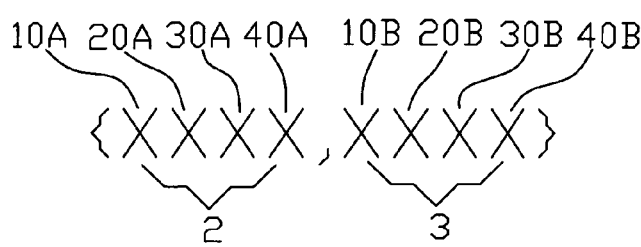
FIG. 5D represents a set of location codes wherein the third set of 34 grids are broken down into 34 additional grids each.
Figure 5E:
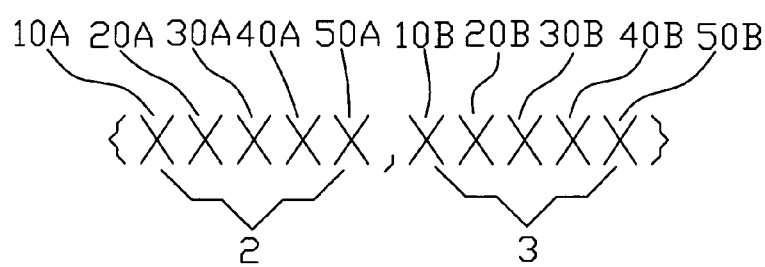
FIG. 5E represents a set of location codes for use with a map overlay of the entire earth.
Figure 5F:
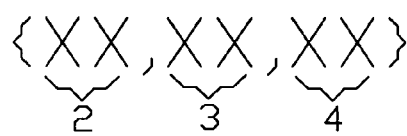
FIG. 5F shows a third set of coordinates that represent an elevation of a point of interest.

FIG. 3 relates to a point defined by two sets of four characters {1,1,1,1;1,1,1,1}, as shown in the format of FIG. 5D, and corresponds to the area defined by broken lines in FIG. 2. This creates 1,500,625×1,500,625 array of lines. An overlay of this size will yield an accuracy of approximately 10 ft$^2$ when overlaid onto a map of the continental United States. By adding an additional character to each of the above sets of characters, the entire world may be easily defined. It should be noted that smaller arrays for specific areas may be arranged for overlaying smaller countries or regions of the world or the system may be used to easily define regions of larger planetary bodies.

Figure 4:
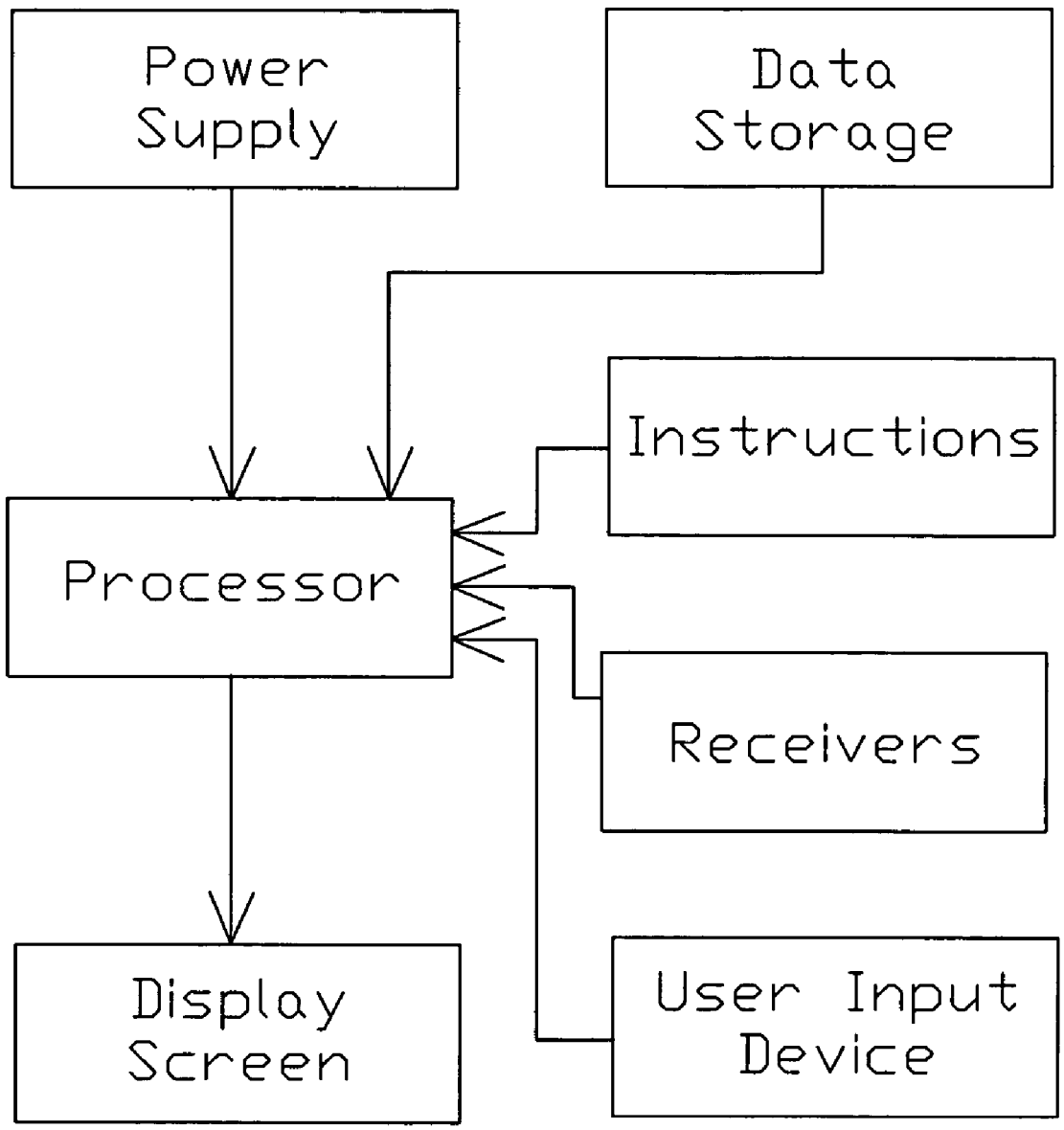
FIG. 4 is a block diagram of a handheld device of the present invention.

FIG. 4 depicts a block diagram representing a handheld device for implementing the invention. The device may comprise a processor, power supply, display and user input device. Data storage and operating instructions may be provided for storing data points and conversion algorithms. A GPS receiver may be included for providing details relating to the location of the device. Instructions may be included as a shown and discussed hereinafter for converting between standard latitude and longitude coordinates into the coordinates of the present invention.

FIGS. 5A through 5E show coordinate formats for various sized grids that may be used in realizing the invention. The first series of characters 2 in each format corresponds to a point of interest represented by a particular longitude or latitude. The step of the process is to first determine whether the first series of characters 2 are within the particular area defined. In the following example, the continental United States is used as the region of interest. However, any region of interest in which a particular point of interest is located may be defined. The continental United States lies between a range beginning at South Latitude 24 and ending at North Latitude 50. If the point of reference lies outside of this range, of between S 24 and N 50, then an overlay of the map, created by the present process is invalid and must be substituted for a different overlay that may also be created to aid one in reaching a particular destination or marking a place on a map. If the invention is realized in an embodiment having a microprocessor and a memory, and the location is invalid, then an error message may be returned by the microprocessor. Otherwise, the microprocessor may cue a user to change to a different map overlay or select a larger sized overlay having additional characters in each set of characters. If the point of interest is within the range, the location code of the present invention is calculated.

If the first series of characters are within a defined area of interest, the current latitude is converted into a percentage between the upper and lower reference points, as shown in the software code of FIG. 8. The percentage is created by taking the latitude value (Lat) and subtracting it by 24, which corresponds to the lower range limit (S) of the Continental United States, as previously mentioned. That is to say, the percentage is created by taking a lower limit of the latitude and subtracting it from the latitude of the point of interest to create a numerator. The denominator is then realized by subtracting the lower limit of the latitude (S) from the upper limit of the latitude (N). This percentage is referenced as a first temporary number (Temp1). The following equation represents the aforementioned process: Temp1=(Lat−S)/(N−S). The source code for realizing a software based device is shown in FIG. 8.

This percentage is then converted into an absolute number between zero and $35^{(4)}-1$, to create a second temporary number, Temp2. This divides the defined region, in this example the continental United States, into 1,500,624 areas or slices. These divisions are represented by a plurality of lines that are parallel to longitudinal lines on a map. The following equation represents the process for creating the second temporary number: Temp2=$(35^4-1)$×(Temp1).

The first character (character 10A) in the first set of characters that define the point of interest is then calculated by dividing Temp2 by $35^3$ and converting the result into an integer. The following equation represents the process for deriving the first character: character 10A=Int(Temp2/$35^3$).

The second character (character 20A) in the first set of characters that define the point of interest is then calculated by recalculating Temp2 to equal the previously defined Temp2 used to calculate the first character (character 10A) less the product of character 10A multiplied by $35^3$. The equation for redefining Temp 2: is Temp2=Temp2−[(character 10A)×$(35^3)$]. Character 20A is then calculated by dividing newly defined Temp2 divided by $35^2$ and then converted into an integer. The equation for calculating character 20B is as follows: character 20B=Int(Temp2/$35^2$).

Temp2 is yet again redefined by using the value of Temp2 used for deriving character 20A and subtracting the product character 20A multiplied by 35 raised to the second power therefrom. This equation is represented by Temp2=Temp2−(character 20A×$35^2$). The third character (character 30A) is then defined by taking the value of Temp2 and dividing it by 35. This equation is represented by: character 30A=Int (Temp2/35).

The fourth character (character 40A) is created by again redefining Temp2 where Temp2 equals the previous Temp2 used to define character 30A less character 30A multiplied by 35. This equation is Temp2=Temp2−(character 30A×35). The new value of Temp2 is then rounded upwards or downwards to create the fourth character.

If any of the characters of equal 35, the character is reset to zero and the previous character is incremented by one. For example, if any one of characters 10A, 20A, 30A, or 40A equal 35 that character is then reset to zero and a value of one is added to the previous character. An equation representing this may be: if character 40A=35 then character 40A=0 and character 30A=character 30A+1. FIG. 9 corresponds to a source code for carrying out the aforementioned process and including the following process.

If the value represented by any of characters 10A through 40A, equals from 10 to 34, the character is represented by a letter. For example, if character 10A equals 10, character 10A would be represented by the letter "A." If character 10A equals 11, character 10A is represented by the letter "B" and so on until when character 10A reaches a value of 35 which corresponds to "Z." It is easily understood that the total number of values represented by a character in the present invention equals 9 (number 1 through 9) and 26 (letters A through Z), for a total of 35 values.

The current longitude is then checked to determine whether it is in the area of interest. If used in a microprocessor base device, the device will return an error message if either the latitude or longitude are outside the map overlay or automatically convert to a different map overlay, as shown in the source code of FIG. 10.

Next, the current longitude of the point of interest is converted into a percentage between the lower and upper reference points. The current longitude corresponds to the second set of characters 3 shown in FIGS. 5A through 5F. The first step is determining whether the point of interest has a longitude within the defined area of interest. In the present example, it is determined whether the point of interest is within the Continental United States by determining whether the point of interest is in a range between reference points, West 125 and East 65. If the point of interest is within this range then the location code is calculated. The software source code for achieving this is shown after the remarks section of the first paragraph shown in FIG. 11. If the Longitude value is West of 125 or East of 65, then a different map overlay must be used to both recognize and navigate to the particular point of interest. An error code will be returned in a microprocessor based device or it will automatically switch to a different map overlay.

If the current longitude is within the range, a Temp1 value is created that represents a percentage between the lower and upper reference points. The numerator of Temp1 is equal to the longitudinal value of the point of interest minus the East 65 limit. The denominator equals the West Longitude value 125 less the East Longitude value 65. This is represented by the source code shown in the second paragraph of FIG. 11.

The percentage is then converted into an absolute number between zero and $35^{(4)}-1$, resulting in the map being further divided by a series lines that are perpendicular to the lines created by the latitude conversion to divide the map into 1,500,624 additional lines. A Temp2 value is then calculated by the following equation: Temp2=$(35^4-1)\times$(Temp1).

The characters in set 3 of FIGS. 5A through 5B are then calculated as shown in the last paragraph of FIG. 8 as follows. Character 10B equals an integer of Temp2 divided by 35 raised to the third power. The equation is representative as Character 10B=Int(Temp2/$35^3$).

The value of Temp2 is changed such that Temp2 equals the value of Temp2 used in calculating character 10B less character 10B multiplied by $35^3$. The equation is Temp2=Temp2−(character 10B×$35^3$). Character 20B is then determined to be the integer value of Temp2 divided by $35^2$. Character 20B=Int(Temp2/$35^2$).

The value of Temp2 is again changed such that Temp2 equals the value of Temp2 used in calculating character 20B less character 20B multiplied by $35^2$. That is, Temp2=Temp2−(character 20B×$35^2$). The value of character 30B is the integer value of Temp2 divided by 35. Or, otherwise represented by the following equation: character 30B=Int(Temp2/35).

The forth digit 40B of the location code must be rounded upwards or downwards. Temp2 is redefined as equaling Temp2 used in calculating character 30B less (character 30B×35). Character 40B is then rounded up or down according to Temp2. FIG. 12 corresponds to a rounding subroutine for rounding each of characters 10B, 20B, 30B and 40B as well as assigning values for characters A thorugh Z. Character 10B corresponds to 121. Character 20B corresponds to 122. Character 30B corresponds to 123. Character 40B corresponds to 124. FIG. 13 is a display code for displaying results of the location code on a microprocessor based device.

Figure 6:
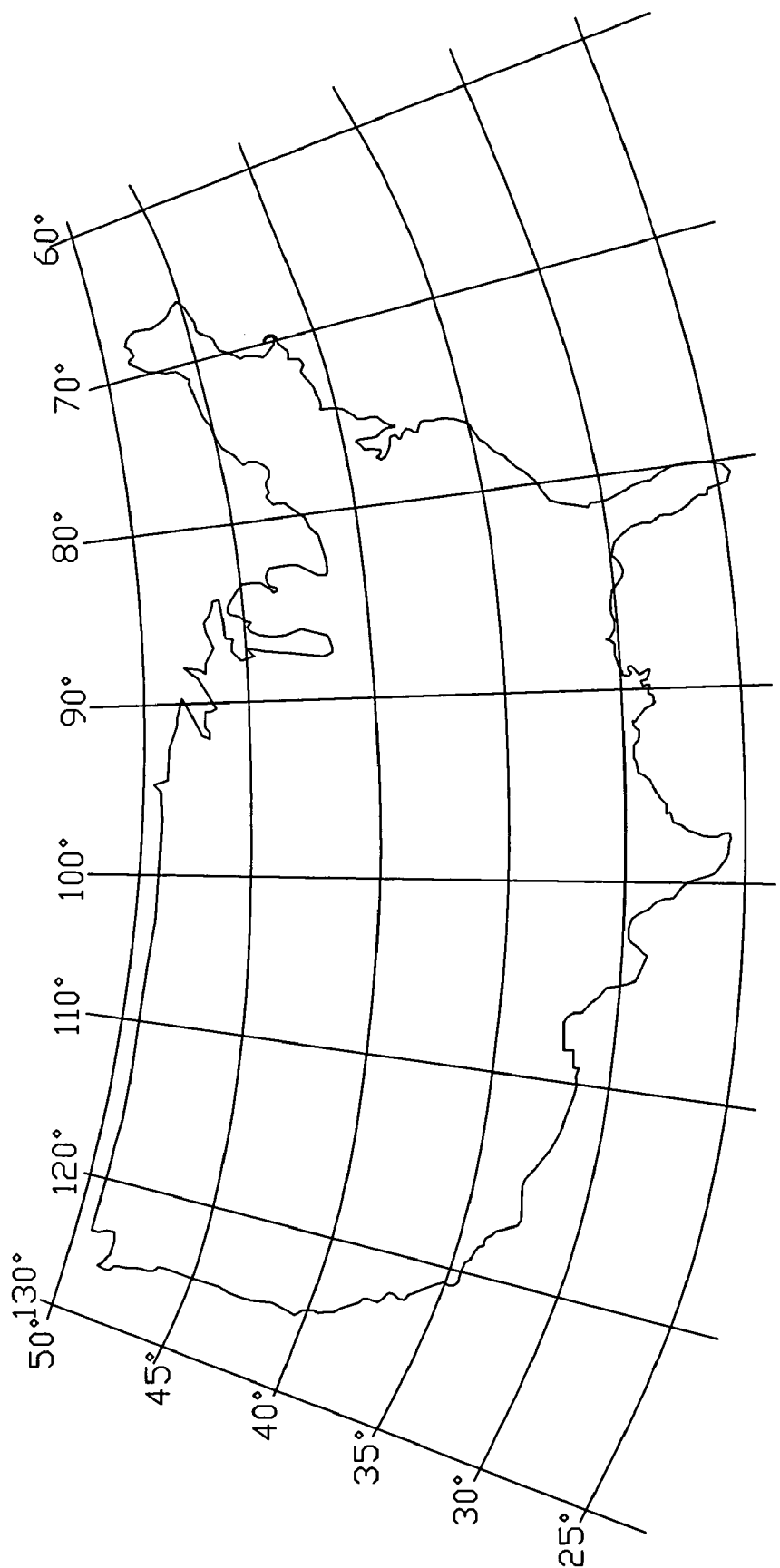
FIG. 6 is an overlay of a map of the United States representing the present coordinate system in use and representing a range of latitudes and longitudes.

FIG. 6 is representative of the current coordinate system in use. As can be recognized, the continental United States is approximately located between 65° and 125° longitude and between 25° and 50° latitude.

Figure 7:
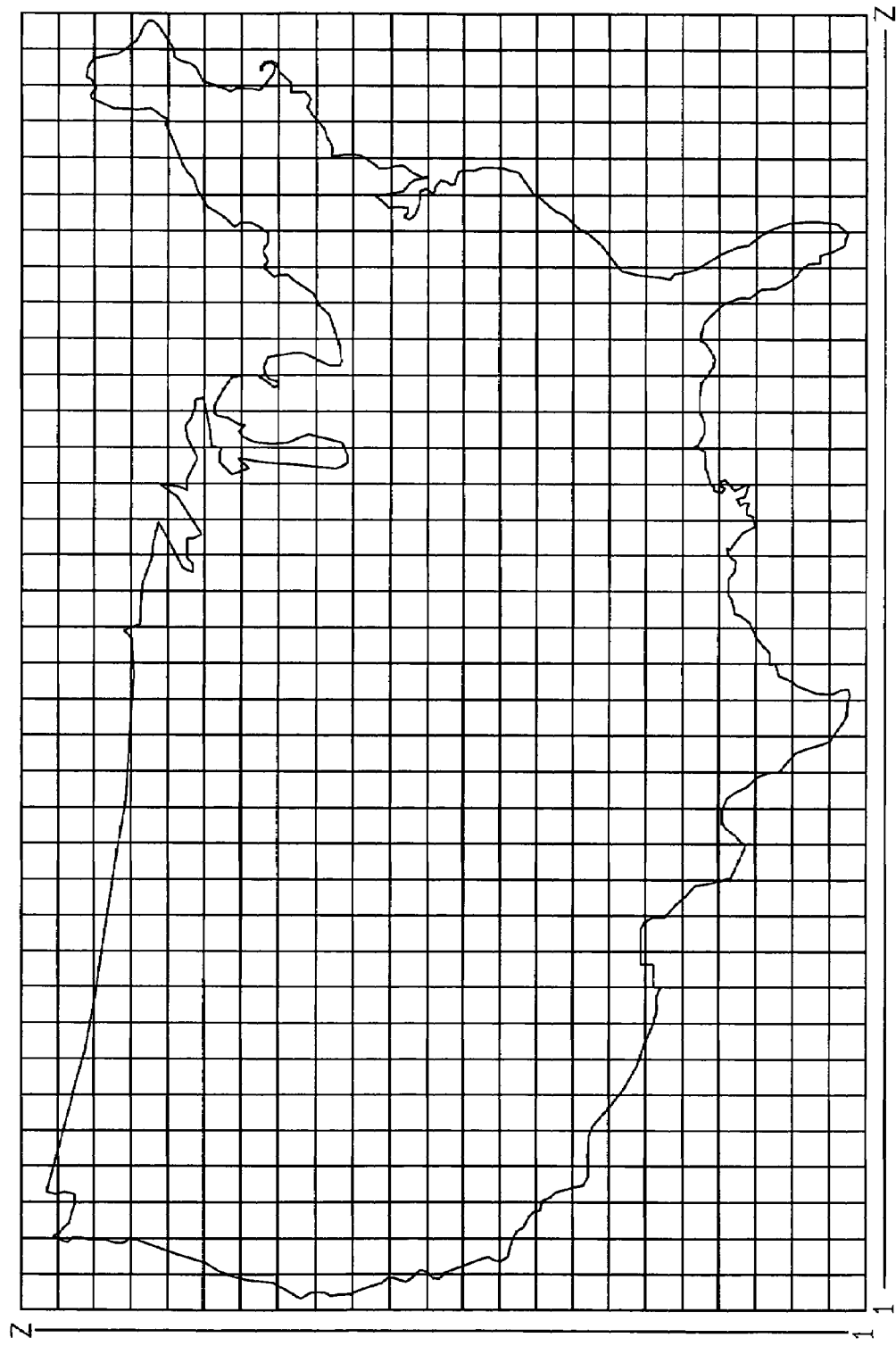
FIG. 7 is an overlay of the same map shown in FIG. 6 and showing the present invention.

FIG. 7 is a representation a map overlay of the present invention. For ease in understanding the invention, only the first set of characters relating to the latitude and longitude are represented. The origin is defined at the lower left edge of the map overlay. Through the use of the present invention, eight characters can represent a point of interest within the defined area to within ten feet.

It is to be understood that the invention is not limited to the exact construction illustrated and described above. Various changes and modifications may be made without departing from the spirit and the scope of the invention as defined in the following claims.

I claim:

1. The process of creating a map overlay that is overlaid onto an area of interest that includes a point of interest, said process comprising:

defining an area of interest by determining North, South, East and West boundaries;

defining an origin having a location that is at least on a boundary that defines the area of interest;

creating a grid system having a first plurality of grids represented by two sets of characters, each set of characters comprising from one to four characters, a value of each character corresponding to a value from 1 to 35;

determining whether a point of reference lies within the defined area of interest by first determining whether a latitude of the point of interest is between the North and South boundaries of the area of interest and then determining whether a longitude of the point of interest is between the East and West boundaries of the area of interest;

converting the Latitude of the point of interest into a percentage by creating a first variable, Temp1(Lat) and defining it as being equal to the value of the Latitude of the point of interest minus the value of the Latitude of the South boundary divided by a difference between the value of the North boundary less the value of the South boundary and being represented as Temp1(Lat)=(Lat−S)/(N−S);

creating a second variable, Temp2(Lat), where Temp2(Lat) is defined as $(35^4-1)\times$(Temp1(Lat));

determining a value of a first character in a first set of characters that represents a location code by defining the first character as being equal to an integer value of Temp2(Lat) divided by $35^3$;

converting the Longitude of the point of interest into a percentage by creating a third variable, Temp1(Lon) and defining it as being equal to the equal to the value of the Longitudinal of the point of interest minus the value of the East boundary divided by a difference between the value of the West boundary less the value of the East boundary;

creating a fourth variable, Temp2(Lon), where Temp2(Lon) is defined as $(35^4-1)\times$(Temp1(Lon)); and, determining a value of a first character in a second set of characters that represents the location code by defining the first character of the second set as being equal to an integer value of Temp2(Lon) divided by $35^3$.

2. The process of claim 1 further comprising:

determining a second character in the first set of characters that define the point of interest by reevaluating Temp2(Lat) to equal the Temp2(Lat) used in calculating the first character in the first set minus (the value of the first character in the first set)×($35^3$) and then calculating the second character to be equal to an integer value of (Temp2(Lat)/$35^2$); and, determining a second character in the second set of characters that define the point of interest by reevaluating Temp2(Lon) to equal the Temp2(Lon) used in calculating the first character in the second set minus (the value of the first character in the second set)×($35^3$) and then calculating the second character in the second set of characters to be equal to an integer value of (Temp2(Lon)/$35^2$).

3. The process of claim 2 further comprising:

determining a third character in the first set of characters that define the point of interest by reevaluating Temp2(Lat) to equal the Temp2(Lat) used in calculating the second character in the first set minus (the value of the second character in the first set)×($35^2$) and then calculating the third character to be equal to an integer value of (Temp2(Lat)/35); and, determining a third character in the second set of characters that define the point of interest by reevaluating Temp2(Lon) to equal the Temp2(Lon) used in calculating the second character in the second set minus [(the value of the second character in the second set)×($35^2$)] and then calculating the third character to be equal to an integer value of (Temp2(Lon)/35).

4. The process of claim 3 further comprising:

determining a fourth character in the first set of characters that define the point of interest by reevaluating Temp2(Lat) to equal the Temp2(Lat) used to define the third character in the first set of characters minus the value of third character multiplied by 35, and rounding Temp2(Lat) upwards or downwards to create the fourth character in the first set of characters; and, determining a fourth character in the second set of characters that define the point of interest by reevaluation Temp2(Lon) to equal the Temp2(Lon) used to define the third character in the second set of characters minus the value of the third character multiplied by 35, and rounding Temp2(Lon) upwards or downwards to create the fourth character in the second set of characters.

5. The process of claim 1 further comprising:
recording the steps recited in claim 1 onto a recording medium for use by a microprocessor.

6. The process of claim 5 further comprising:
evaluating the value of each character in each set of characters to determine whether the value is greater than 9, if so, then representing the value as a letter of the alphabet between A and Z.

7. The process of claim 1 further comprising:
determining whether the value any of the characters equal 35, if the value equals 35, then the value is reset to zero and an immediate character to the left of the character whose value is reset to zero is incremented by one.

8. The process of claim 1 further comprising:
representing each character between by a number between 1-9 or a letter between A-Z.

9. The process of claim 1 further comprising:
dividing up each grid comprising the grid system into a plurality of grids.

10. A system having a mapping program and including a map for precisely representing a location, said system comprising:
a device comprising a processor;
a power supply supplying power to the device;
a display connected to said processor for displaying a map, map overlay and a point of interest;
an input device for inputting two sets of characters that represent a location code; and,
a data storage device having operating instructions, said operating instructions including a source code that defines an area of interest by determining North, South, East and West boundaries, creating a grid system having a first plurality of grids represented by two sets of characters, each set of characters comprising from one to four characters, a value of each character corresponding to a value from 1 to 35, the operating instructions further include code that determines whether a point of reference lies within the defined area of interest by first determining whether a latitude of the point of interest is between the North and South boundaries of the area of interest and then determining whether a longitude of the point of interest is between the East and West boundaries of the area of interest, the source code converts the Latitude of the point of interest into a percentage by creating a first variable, Temp1(Lat) and defining it as being equal to the value of the Latitude of the point of interest minus the value of the Latitude of the South boundary divided by a difference between the value of the North boundary less the value of the South boundary and being represented as Temp1(Lat)=(Lat−S)/(N−S), the source code further creates a second variable, Temp2(Lat), where Temp2(Lat) is defined as $(35^4-1) \times (Temp1(Lat))$, the source code determines a value of a first character in a first set of characters that represents a location code by defining the first character as being equal to an integer value of Temp2(Lat) divided by $35^3$, the source code converts the Longitude of the point of interest into a percentage by creating a third variable, Temp1(Lon) and defining it as being equal to the value of the Longitudinal of the point of interest minus the value of the East boundary divided by a difference between the value of the West boundary less the value of the East boundary, the source code creates a fourth variable, Temp2(Lon), where Temp2(Lon) is defined as $(35^4-1) \times (Temp1(Lon))$, and, the source code determines a value of a first character in a second set of characters that represents the location code by defining the first character of the second set as being equal to an integer value of Temp2(Lon) divided by $35^3$.

11. The system of claim 10 further comprising:
the data storage device having operating instructions, said operating instructions including a source code that determines a second character in the first set of characters that define the point of interest by reevaluating Temp2(Lat) to equal the Temp2(Lat) used in calculating the first character in the first set minus ((the value of the first character in the first set)×$(35^3)$) and then calculating the second character to be equal to an integer value of (Temp2(Lat)/$35^2$); and,
said data storage device includes operating instructions that determining a second character in the second set of characters that define the point of interest by reevaluating Temp2(Lon) to equal the Temp2(Lon) used in calculating the first character in the second set minus ((the value of the first character in the second set)× $(35^3)$) and then calculating the second character in the second set of characters to be equal to an integer value of (Temp2(Lon)/$35^2$).

12. The system of claim 11 further comprising:
the data storage device having operating instructions, said operating instructions including a source code that determines a third character in the first set of characters that define the point of interest by reevaluating Temp2(Lat) to equal the Temp2(Lat) used in calculating the second character in the first set minus ((the value of the second character in the first set)×$(35^2)$) and then calculating the third character to be equal to an integer value of (Temp2(Lat)/35); and,
the data storage device having operating instructions, said operating instructions including a source code that determines a third character in the second set of characters that define the point of interest by reevaluating Temp2(Lon) to equal the Temp2(Lon) used in calculating the second character in the second set minus [(the value of the second character in the second set)×$(35^2)$] and then calculating the third character to be equal to an integer value of (Temp2(Lon)/35).

13. The system of claim 12 further comprising:
the data storage device having operating instructions, said operating instructions including a source code that determines a fourth character in the first set of characters that define the point of interest by reevaluating Temp2(Lat) to equal the Temp2(Lat) used to define the third character in the first set of characters minus the value of third character multiplied by 35, and rounding Temp2(Lat) upwards or downwards to create the fourth character in the first set of characters; and,
the data storage device having operating instructions, said operating instructions including a source code that determines a fourth character in the second set of characters that define the point of interest by reevaluation Temp2(Lon) to equal the Temp2(Lon) used to define the third character in the second set of characters minus the value of the third character multiplied by 35, and rounding Temp2(Lon) upwards or downwards to create the fourth character in the second set of characters.

14. The system of claim 10 further comprising:
operating instructions that evaluate the value of each character in each set of characters to determine whether the value is greater than 9, if so, then representing the value as a letter of the alphabet between A and Z.

15. The system of claim 10 further comprising:
operating instructions that determine whether the value any of the characters equal 35, if the value equals 35, then the value is reset to zero and an immediate character to the left of the character whose value is reset to zero is incremented by one.

16. The system of claim 10 further comprising:
operating instructions that represent each character between by a number between 1-9 or a letter between A-Z.

17. The system of claim 10 further comprising:
operating instructions that divide up each grid comprising the grid system into a plurality of grids.

18. A microprocessor based system comprising a mapping program and including a map for precisely representing a location, said system comprising:
a microprocessor;
a power supply; and,
a data storage device having operating instructions, said operating instructions including a source code that defines an area of interest by determining North, South, East and West boundaries, creating a grid system having a first plurality of grids represented by two sets of characters, each set of characters comprising from one to four characters, a value of each character corresponding to a value from 1 to 35, the operating instructions further include code that determines whether a point of reference lies within the defined area of interest by first determining whether a latitude of a point of interest is between the North and South boundaries of the area of interest and then determining whether a longitude of the point of interest is between the East and West boundaries of the area of interest, the source code converts the Latitude of the point of interest into a percentage by creating a first variable, Temp1(Lat) and defining it as being equal to the value of the Latitude of the point of interest minus the value of the Latitude of the South boundary divided by a difference between the value of the North boundary less the value of the South boundary and being represented as Temp1(Lat)=(Lat−S)/(N−S), the source code further creates a second variable, Temp2(Lat), where Temp2(Lat) is defined as $(35^4-1) \times (Temp1(Lat))$, the source code determines a value of a first character in a first set of characters that represents a location code by defining the first character as being equal to an integer value of Temp2(Lat) divided by $35^3$, the source code converts the Longitude of the point of interest into a percentage by creating a third variable, Temp1(Lon) and defining it as being equal to the equal to the value of the Longitudinal of the point of interest minus the value of the East boundary divided by a difference between the value of the West boundary less the value of the East boundary, the source code creates a fourth variable, Temp2(Lon), where Temp2(Lon) is defined as $(35^4-1) \times (Temp1(Lon))$, and, the source code determines a value of a first character in a second set of characters that represents the location code by defining the first character of the second set as being equal to an integer value of Temp2(Lon) divided by $35^3$,
the data storage device further including operating instructions, said operating instructions including a source code that determines a second character in the first set of characters that define the point of interest by reevaluating Temp2(Lat) to equal the Temp2(Lat) used in calculating the first character in the first set minus ((the value of the first character in the first set)$\times(35^3)$) and then calculating the second character to be equal to an integer value of $(Temp2(Lat)/35^2)$ and said data storage device includes operating instructions that determining a second character in the second set of characters that define the point of interest by reevaluating Temp2(Lon) to equal the Temp2(Lon) used in calculating the first character in the second set minus ((the value of the first character in the second set)$\times(35^3)$) and then calculating the second character in the second set of characters to be equal to an integer value of $(Temp2(Lon)/35^2)$;
the data storage device further including a source code that determines a third character in the first set of characters that define the point of interest by reevaluating Temp2(Lat) to equal the Temp2(Lat) used in calculating the second character in the first set minus [(the value of the second character in the first set)$\times(35^2)$] and then calculating the third character to be equal to an integer value of $(Temp2(Lat)/35)$ and, operating instructions including a source code that determines a third character in the second set of characters that define the point of interest by reevaluating Temp2(Lon) to equal the Temp2(Lon) used in calculating the second character in the second set minus ((the value of the second character in the second set)$\times(35^2)$) and then calculating the third character to be equal to an integer value of $(Temp2(Lon)/35)$,
said operating instructions including a source code that determines a fourth character in the first set of characters that define the point of interest by reevaluating Temp2(Lat) to equal the Temp2(Lat) used to define the third character in the first set of characters minus the value of third character multiplied by 35, and rounding Temp2(Lat) upwards or downwards to create the fourth character in the first set of characters and, the data storage device having operating instructions, said operating instructions including a source code that determines a fourth character in the second set of characters that define the point of interest by reevaluation Temp2(Lon) to equal the Temp2(Lon) used to define the third character in the second set of characters minus the value of the third character multiplied by 35, and rounding Temp2(Lon) upwards or downwards to create the fourth character in the second set of characters; and
the operating instructions that evaluate the value of each character in each set of characters to determine whether the value is greater than 9, if so, then representing the value as a letter of the alphabet between A and Z.

19. The microprocessor based system of claim 18 further comprising:
operating instructions that determine whether the value any of the characters equal 35, if the value equals 35, then the value is reset to zero and an immediate character to the left of the character whose value is reset to zero is incremented by one.

20. The microprocessor system of claim 18 further comprising:
operating instructions that represent each character between by a number between 1-9 or a letter between A-Z.

* * * * *